(12) United States Patent
    duPont

(10) Patent No.: US 10,899,103 B2
(45) Date of Patent: Jan. 26, 2021

(54) ISOGRID STIFFENING ELEMENTS

(71) Applicant: Anthony A. duPont, Manchester Center, VT (US)

(72) Inventor: Anthony A. duPont, Manchester Center, VT (US)

( * ) Notice: Subject to any disclaimer, the term of this patent is extended or adjusted under 35 U.S.C. 154(b) by 392 days.

(21) Appl. No.: 15/786,002

(22) Filed: Oct. 17, 2017

(65) Prior Publication Data
    US 2018/0117873 A1    May 3, 2018

Related U.S. Application Data

(60) Provisional application No. 62/416,827, filed on Nov. 3, 2016.

(51) Int. Cl.
    *B32B 3/20* (2006.01)
    *B32B 3/26* (2006.01)
    (Continued)

(52) U.S. Cl.
    CPC ............ *B32B 3/20* (2013.01); *B32B 1/02* (2013.01); *B32B 3/04* (2013.01); *B32B 3/085* (2013.01); *B32B 3/26* (2013.01); *B32B 3/266* (2013.01); *B32B 3/28* (2013.01); *B32B 5/02* (2013.01); *B64C 1/06* (2013.01); *B64C 1/064* (2013.01); *B64C 1/12* (2013.01); *B64C 3/182* (2013.01); *B64C 3/26* (2013.01); *B64D 37/20* (2013.01); *B64D 37/32* (2013.01); *B64G 1/40* (2013.01); *B64G 1/402* (2013.01); *B64G 1/42* (2013.01); *B32B 2250/44* (2013.01); (Continued)

(58) Field of Classification Search
    CPC .... B32B 1/02; B32B 1/08; B32B 3/04; B32B 3/085; B32B 3/20; B32B 3/26; B32B 3/266; B32B 3/28; B32B 5/02; B64C 1/06; B64C 1/12; B64C 1/064; B64C 3/182; B64C 3/26; B64G 1/40; B64G 1/402; B64G 1/42; B64D 37/20; B64D 37/32
    See application file for complete search history.

(56) References Cited

U.S. PATENT DOCUMENTS

2002/0033221 A1    3/2002  Nakamura
2009/0309264 A1   12/2009  Cavaliere
                          (Continued)

OTHER PUBLICATIONS

Wikipedia.com entry for "isogrid", accessed Apr. 26, 2020.*
(Continued)

*Primary Examiner* — Walter Aughenbaugh
(74) *Attorney, Agent, or Firm* — Buckley, Maschoff & Talwalkar LLC

(57) ABSTRACT

Some embodiments are directed to an apparatus, such as a panel that might be appropriate for aircraft or space vehicle fuel tanks. According to some embodiments, a plurality of stiffening elements may be attached to a matrix stiffened laminate skin and arranged in an isogrid pattern. Each stiffening element may include, for example, a hollow hat-shaped and substantially rectangular cross-sectional profile and a layer of unidirectional fibers proximate to a top portion of the stiffening element. In some embodiments, the stiffening elements may be created on top of a core element that is later removed (e.g., by dissolving, melting, or vaporizing the core element after the stiffening elements and fiber skin are cured with heat).

4 Claims, 11 Drawing Sheets

(51) Int. Cl.
    *B32B 1/02*     (2006.01)
    *B32B 5/02*     (2006.01)
    *B32B 3/04*     (2006.01)
    *B32B 3/28*     (2006.01)
    *B32B 3/08*     (2006.01)
    *B64D 37/32*     (2006.01)
    *B64C 1/06*     (2006.01)
    *B64C 3/18*     (2006.01)
    *B64C 3/26*     (2006.01)
    *B64C 1/12*     (2006.01)
    *B64G 1/42*     (2006.01)
    *B64G 1/40*     (2006.01)
    *B64D 37/20*     (2006.01)

(52) U.S. Cl.
    CPC ... *B32B 2260/021* (2013.01); *B32B 2260/046* (2013.01); *B32B 2262/106* (2013.01)

(56) References Cited

U.S. PATENT DOCUMENTS

| | | |
|---|---|---|
| 2011/0315824 A1 | 12/2011 | Pook et al. |
| 2012/0024468 A1 | 2/2012 | Chaume et al. |
| 2012/0219764 A1 | 8/2012 | Biomstad et al. |
| 2014/0251529 A1 | 9/2014 | Blot et al. |

OTHER PUBLICATIONS

"PCT Search Report and Written Opinion", International Searching Authority, dated Jan. 2, 2018, for International Application No. PCT/US2017/056926, 10pgs.

\* cited by examiner

ISOGRID STIFFENING ELEMENTS

CROSS-REFERENCE TO RELATED APPLICATIONS

The present application claims the benefit of U.S. Provisional Patent Application No. 62/416,827 entitled "ISOGRID STIFFENING ELEMENTS" and filed Nov. 3, 2016. The entire contents of that application are incorporated herein by reference.

BACKGROUND

Some embodiments disclosed herein relate to stiffening elements and, more particularly, to systems and methods associated with stiffening elements arranged in an isogrid pattern.

In some cases, a design may need to provide substantial structural stiffness while using a minimal amount of material. For example, panels on a fuel tank for an aircraft or space vehicle might need to be both strong and light. Various arrangements of stiffening elements have been proposed to achieve these goals including honeycomb, vertical webs, skin and stringers, etc. One arrangement, referred to as an isogrid configuration of triangular integral stiffening ribs, can help meet these goals but can be difficult and expensive to manufacture. It would therefore be desirable to efficiently and accurately facilitate creation of stiffening elements in an isogrid pattern.

SUMMARY

Some embodiments are directed to an apparatus, such as a panel that might be appropriate for aircraft or space vehicle fuel tanks. According to some embodiments, a plurality of stiffening elements may be attached to a matrix stiffened laminate skin and arranged in an isogrid pattern. Each stiffening element may include, for example, a hollow hat-shaped and substantially rectangular cross-sectional profile and a layer of unidirectional fibers proximate to a top portion of the stiffening element. In some embodiments, the stiffening elements may be created on top of a core element that is later removed (e.g., by dissolving, melting, or vaporizing the core element after the stiffening elements and fiber skin are cured with heat).

Some embodiments comprise: means for placing a core element, arranged in an isogrid pattern, on a matrix stiffened laminate skin; means for creating a plurality of stiffening elements over the core element such that each stiffening element is attached to the matrix stiffened laminate skin and includes a hollow hat-shaped and substantially rectangular cross-sectional profile; and means for removing the core element.

Technical effects of some embodiments of the invention are improved and computerized ways to efficiently and accurately facilitate creation of stiffening elements in an isogrid pattern. With these and other advantages and features that will become hereinafter apparent, a more complete understanding of the nature of the invention can be obtained by referring to the following detailed description and to the drawings appended hereto.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
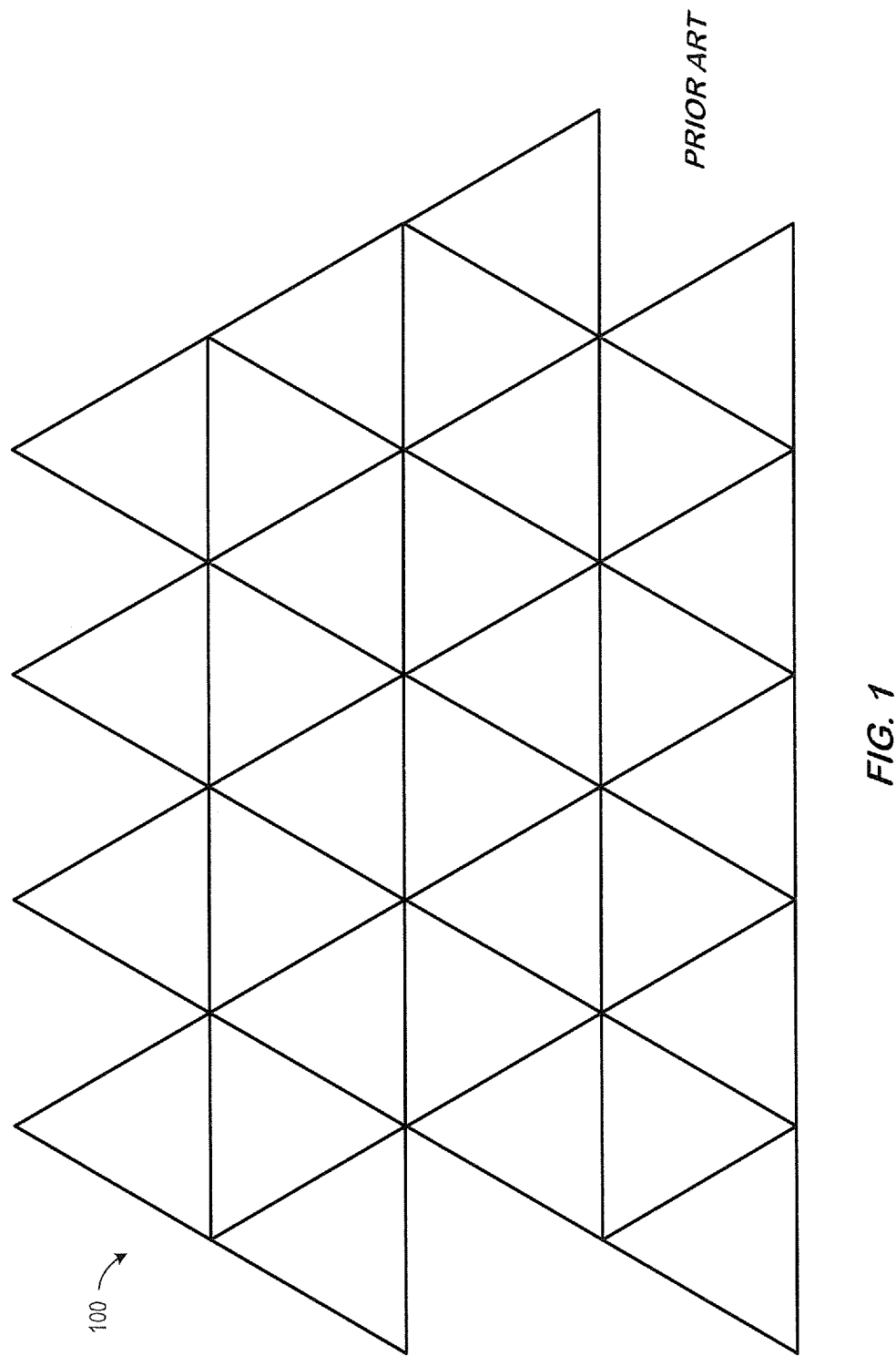
FIG. 1 is an illustration of an isogrid pattern.

In some cases, a design may need to provide substantial structural stiffness while using a minimal amount of material. For example, panels on a fuel tank for an aircraft or space vehicle might need to be strong, light, and able to tolerate damage (e.g., space vehicle payload shrouds and boosters need to support the full weight of upper stages and payloads under high G loads). Various arrangements of stiffening elements have been proposed to achieve these goals including honeycomb, vertical webs, skin and stringers, etc. One arrangement, referred to as an isogrid configuration of triangular integral stiffening ribs, can help meet these goals. FIG. 1 is an illustration of an isogrid pattern 100 formed of stiffening elements arranged at substantially 60° angles. This pattern 100 may be relatively efficient because it retains rigidity while saving material (and, thus, weight). The pattern 100 may act as an isotropic material with equal properties measured in various directions.

Figure 2:
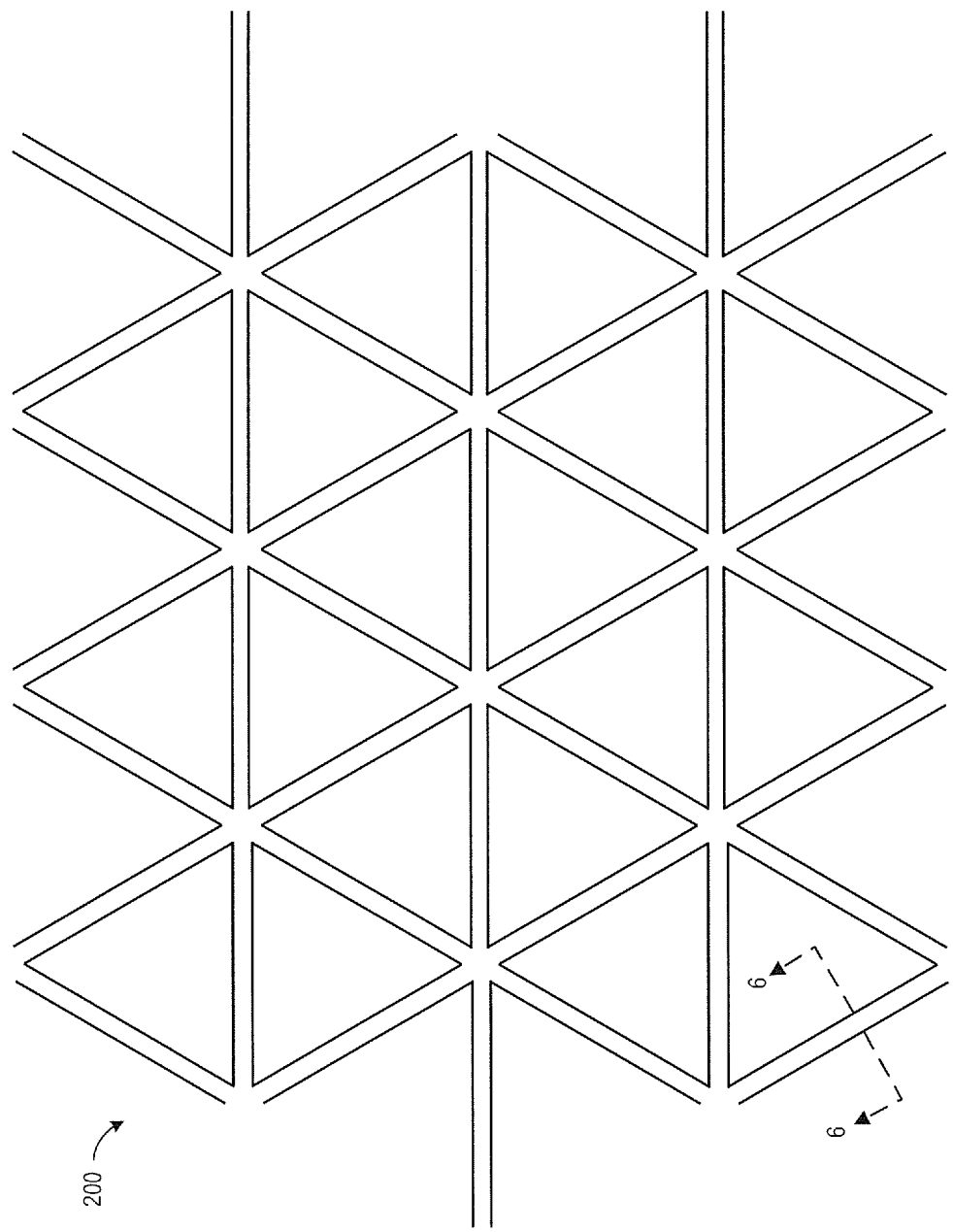
FIG. 2 is a top view of stiffening elements in accordance with some embodiments.

Note, however, that an isogrid configuration can be relatively difficult and expensive to manufacture. It would therefore be desirable to efficiently and accurately facilitate creation of stiffening elements in an isogrid pattern. FIG. 2 is a top view of stiffening elements 200 in accordance with some embodiments. As used herein, the term "isogrid" may refer to, for example, an array of stiffening elements arranged approximately 60° apart and attached to a structural skin to provide stiffness. The triangular arrangement may provide stiffness in all directions as well as torsional rigidity. The triangular arrangement may also allow the stiffening elements 200 to resist loads in the plane of the skin in multiple directions (e.g., all directions), so there may be a substantially low weight penalty for adding the isogrid stiffeners.

Note that while some embodiments described herein may be associated with a specific design and/or method of fabrication suitable for stiffened aircraft structural panels, the principles and manufacturing methods can be used for other stiffened panels where weight, or minimum material, is an important consideration. Currently, one of the lightest stiffened panels used in aircraft is "honeycomb sandwich." A honeycomb sandwich is composed of a lightweight core resembling a honeycomb glued or welded to two face sheets on either side. The welded metal sandwich panels are often used in aircraft engine thrust reversers. Aluminum or composite fiber panels glued to honeycomb core were often used in aeronautical applications, but encountered environmental problems. For example, if moisture is present in the core it can freeze out, sucking in more moist air and therefore adding additional moisture. When the ice vaporizes in warmer conditions the pressure can tear off the skin from the honeycomb core. Some embodiments of the present invention may provide a solution that could be at least as light as a honeycomb core sandwich without the associated environmental problems. The isogrid illustrated in FIG. 2 may stiffen a skin whereas a sandwich separates the skin into two half thickness skins that are more susceptible to hail and other impact damage.

Figure 3:
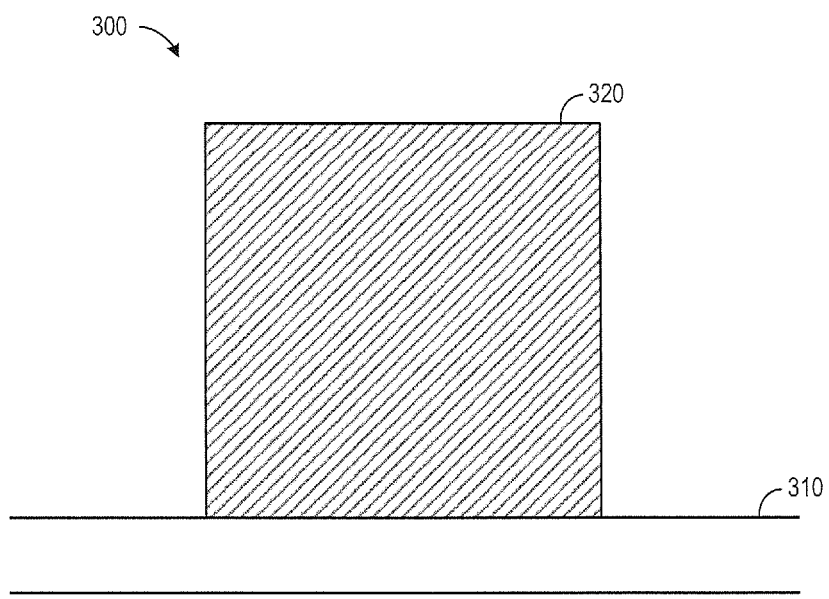
FIG. 3 illustrates an initial manufacturing step according to some embodiments.

FIGS. 3 through 7 will now be used to describe a fabrication technique. Note that these FIGS. are presented along the cross-section line 6-6 of FIG. 2 in accordance with some embodiments. According to some embodiments, the fabrication technique begins with laying up a skin in a conventional manner. For example, FIG. 3 illustrates 300 an initial manufacturing step wherein a core element 320 is placed on a matrix stiffened laminate skin 310 according to some embodiments. Note that the matrix stiffened laminate skin 310 might comprise, for example, a carbon fiber composite skin. As used herein, the phrase "matrix stiffened laminate skin" may refer to a composite skin which is made of cloth saturated with a matrix material (e.g., epoxy resin) and cured either with heat or a hardener mixed with the resin. Note that a composite laminate might be composed of layers of cloth, or possibly random or unidirectional fibers impregnated with resin and cured.

Figure 4:
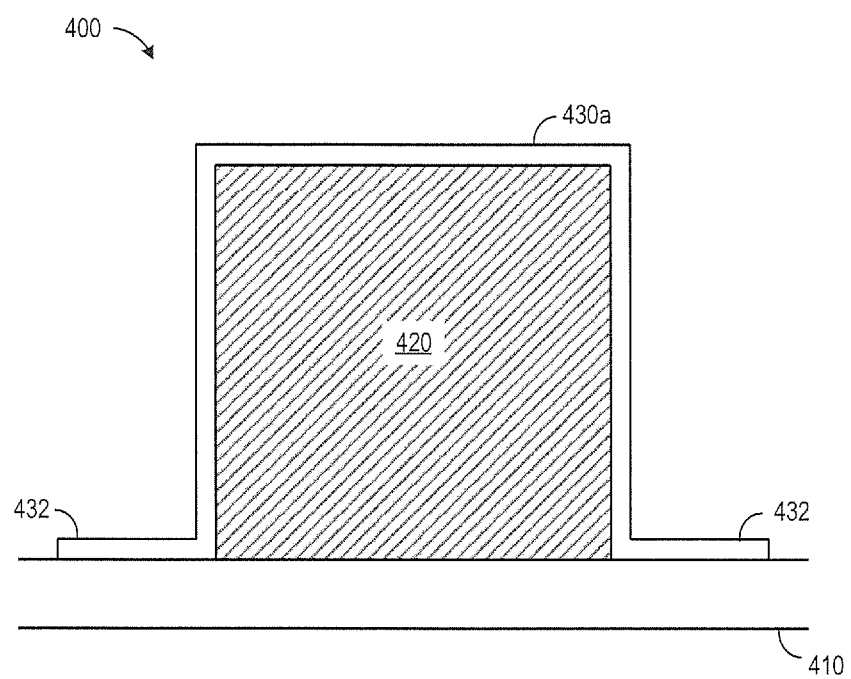
FIG. 4 illustrates creation of an isogrid stiffening element in accordance with some embodiments.

Next, hat-shaped section stiffeners may be laid on the cores. For example, FIG. 4 illustrates 400 an isogrid stiffening element 430*a* created over a core element 420 in accordance with some embodiments. Note that the stiffening element 430*a* may include foot portions 432 that facilitate bonding with a matrix stiffened laminate skin 410. With such an arrangement, shear may be directed into these foot portions 432.

Figure 5:
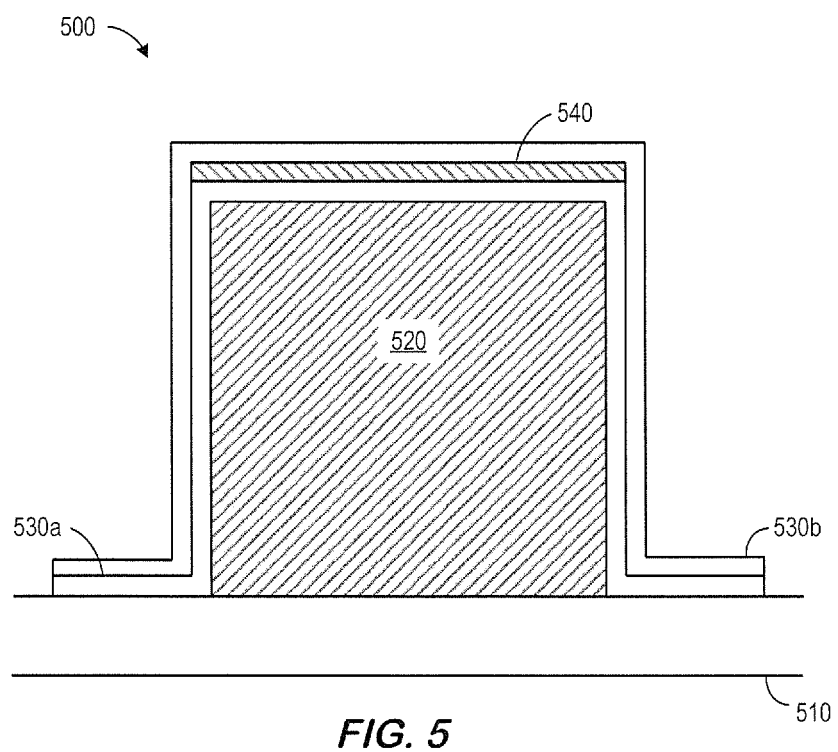
FIG. 5 illustrates unidirectional fibers according to some embodiments.

According to some embodiments, a correct amount of unidirectional material may be added to the top of the stiffeners. For example, FIG. 5 illustrates 500 unidirectional fibers 540 (e.g., extending into and out of the page) formed between two layers 530*a*, 530*b* of a stiffening element according to some embodiments. Note that the unidirectional fibers 540 may be applied proximate to a top portion of the stiffening element. Note that the cloth 530*a*, 530*b* may be both on top and on bottom of the unidirectional material 540 and the unidirectional material 540 might be between the cloth layers if there were more than two layers of cloth. Such an arrangement may let the load on the unidirectional material 540 be transferred to the cloth (which carries the shear between the cap and the skin).

Figure 6:
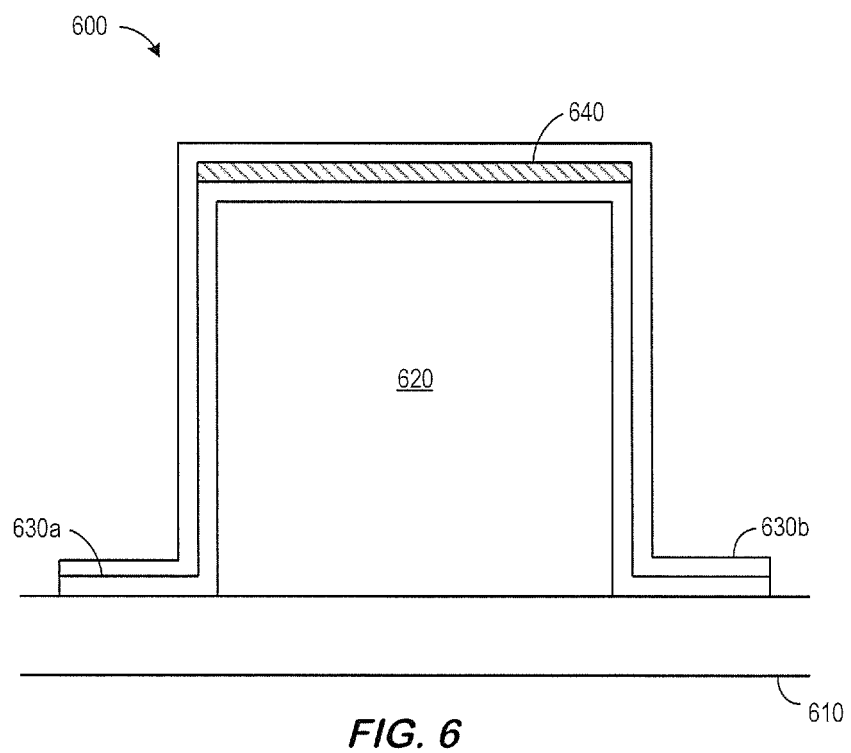
FIG. 6 is a cross-sectional view taken along the cross-section line 6-6 of FIG. 2 in accordance with some embodiments.
Figure 7:
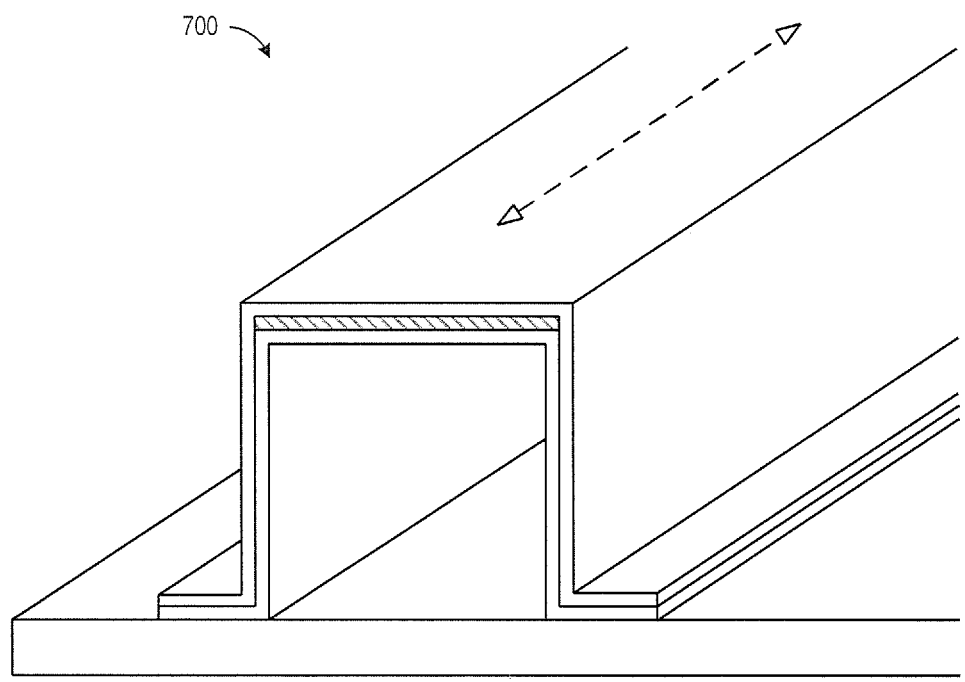
FIG. 7 is a perspective view of the stiffening element of FIG. 6.

Next, the completed layup may be cured with heat and the core may be removed (e.g., by dissolving, melting, or vaporizing the core depending on the properties of the core material). FIG. 6 is a cross-sectional view 600 taken along the cross-section line 6-6 of FIG. 2 in accordance with some embodiments. It represents the illustration 500 of FIG. 5 with the core element 520 removed. The layers 630*a*, 630*b*, unidirectional fibers 640 and matrix stiffened laminate skin 610 may have been cured with heat. By way of example, fabrication of isogrid panels might use a plaster core element 520 that is to be dissolved with water after the panel was cured. As another example, composite parts might be laid up on polystyrene foam cores that are to be dissolved in gasoline after cure. As still another example, composite parts might be laid up on polystyrene foam cores that are to be vaporized after cure. FIG. 7 is a perspective view 700 of the stiffening element of FIG. 6

Figure 8:
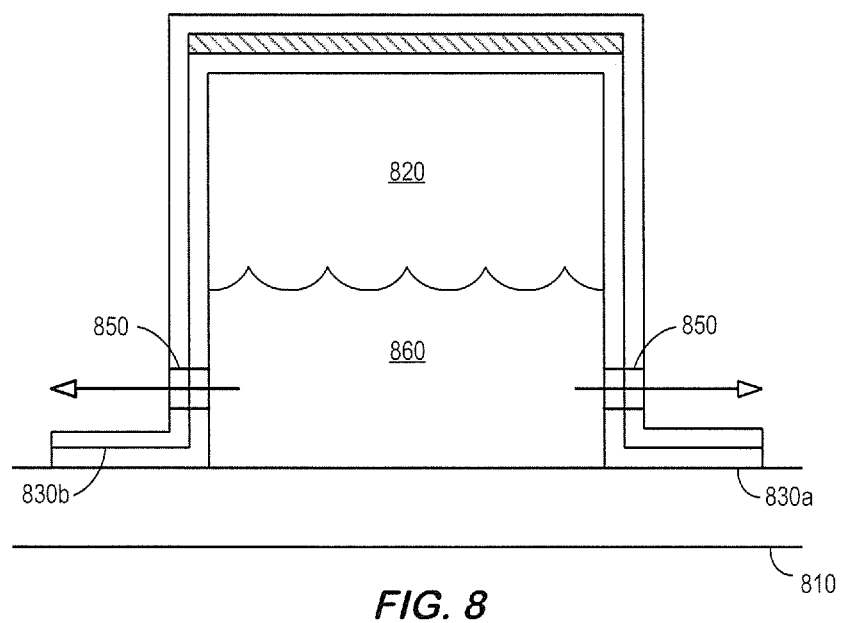
FIG. 8 illustrates drain holes for stiffening elements according to some embodiments.

According to some embodiments, at least one drain hole may be provided in at least one stiffening element to permit liquid to leave a hollow portion of the stiffening element. For example, FIG. 8 illustrates 800 drain holes for stiffening elements according to some embodiments. In particular, two holes 850 are provided in the layers 830*a*, 830*b* near the matrix stiffened laminate skin 810. In this way, liquid 860 in the hollow portion 820 might be removed from the stiffening element. The liquid 860 might be associated with, for example, a melted core element or fuel (e.g., when the stiffening element is associated with a composite tank wall adapted to hold aircraft or rocket fuel that needs to be drained from the tank on occasion).

Figure 9:
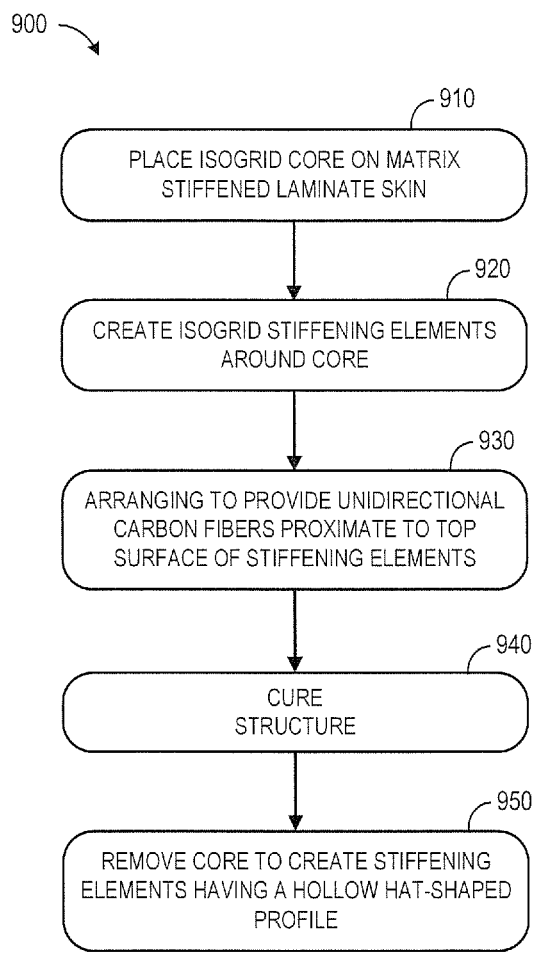
FIG. 9 is a method of creating isogrid stiffening elements in accordance with some embodiments.

FIG. 9 is a method 900 of creating isogrid stiffening elements in accordance with some embodiments. The flow chart described herein does not imply a fixed order to the steps, and embodiments of the present invention may be practiced in any order that is practicable. At 910, a core element is placed on a matrix stiffened laminate skin in an isogrid pattern. At 920, a plurality of stiffening elements are created over the core element such that each stiffening element is attached to the matrix stiffened laminate skin and includes a hollow hat-shaped (and substantially rectangular) cross-sectional profile. At 930, a layer of unidirectional fibers may be provided proximate to a top portion of the stiffening element. At 940, the stiffening elements and matrix stiffened laminate skin may be cured with heat.

At 950, the core element may be removed. According to some embodiments, the core elements that define the hat-shaped stiffeners are made of a material that can be dissolved for removal of the core after the panel is cured. According to other embodiments, the core elements that define the hat-shaped stiffeners are made of a material that can be melted for removal of the core after the panel is cured. According to still other embodiments, the core elements that define the hat-shaped stiffeners are made of a material that can be vaporized for removal of the core after the panel is cured.

Thus, some embodiments described herein may provide a carbon fiber composite skin that is stiffened by rectangular cross section hat-shaped stiffeners oriented approximately 60° from one another forming substantially equilateral triangles between the stiffeners. The top of the stiffeners may contain additional unidirectional carbon fibers which are substantially stronger in the stiffener's longitudinal direction than the cloth that comprises the skin and the hat-shaped stiffener. This arrangement may be, for example, approximately 25% lighter than an equivalent honeycomb panel (and may weigh approximately half as much as an equivalent conventional stringer stiffened aluminum panel).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 10:
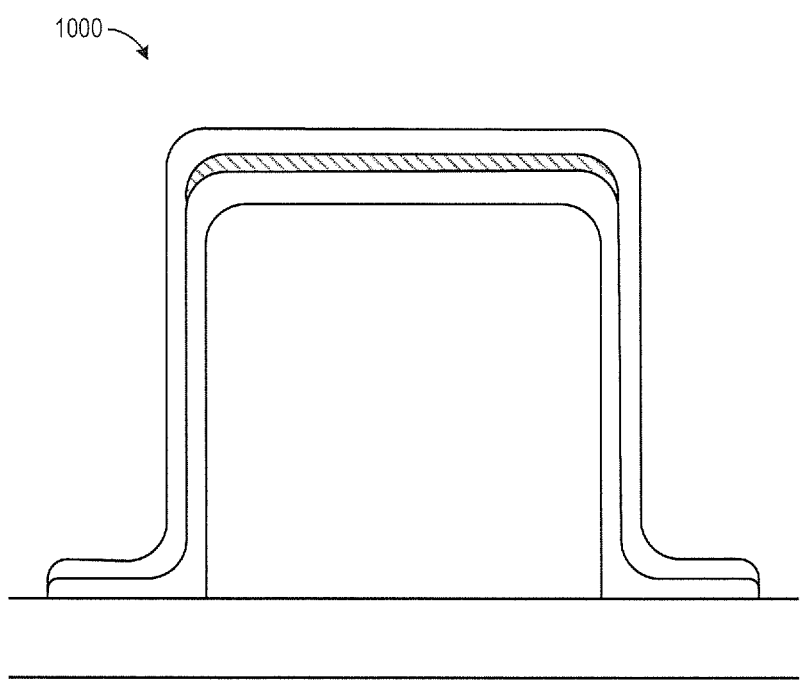
FIG. 10 illustrates an isogrid stiffening element according to another embodiment.
Figure 11:
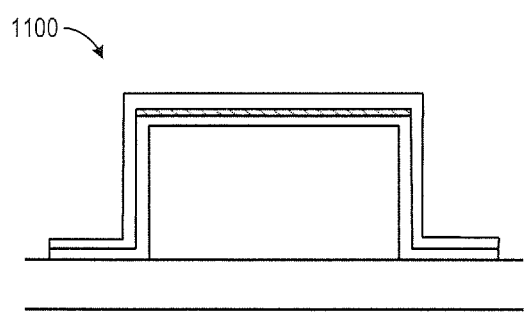
FIGS. 11 and 12 illustrate isogrid stiffening elements having other profiles according to various embodiments.
Figure 12:
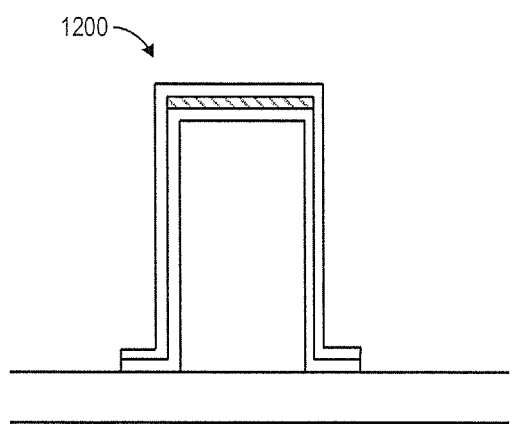

Although specific configurations have been described herein, note that any number of other configurations may be provided in accordance with embodiments of the present invention. For example, FIGS. 2 through 8 were illustrated using sharp, generally 90° corners. Note, however, that actual manufacturing techniques may result in more "rounded" corners. FIG. 10 illustrates an isogrid stiffening element 1000 having such rounded corners according to another embodiment. Moreover, the hat-shaped profile of a stiffening element may have various types of rectangular profiles, including a substantially square profile. FIGS. 11 and 12 illustrate isogrid stiffening elements having other profiles according to various embodiments. In particular, FIG. 11 illustrates a stiffening element 1100 with a squatter, wider profile while FIG. 12 illustrates a stiffening element 1200 with a taller, more narrow profile.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. An apparatus, comprising:
   a laminate skin, wherein the laminate skin is a cloth saturated with an epoxy resin matrix material cured using at least one of: (i) heat and (ii) a hardener mixed with the epoxy resin; and
   a plurality of stiffening elements attached to the laminate skin and arranged in an isogrid pattern, wherein each stiffening element includes:
      a first foot portion parallel with and bonded to the laminate skin,
      a first side wall normal to the laminate skin and attached to the first foot portion,
      a top portion parallel with and away from the laminate skin, the top portion having a first side attached to the first side wall,
      a second side wall normal to the laminate skin and attached to a second side of the top portion opposite the first side,
      a second foot portion, attached to the second side wall, parallel with and bonded to the laminate skin, and
      a layer of unidirectional fibers proximate to the top portion of the stiffening element.

2. The apparatus of claim 1, wherein at least one stiffening element further includes at least one drain hole to permit liquid to leave a hollow portion of the stiffening element.

3. The apparatus of claim 1, wherein the unidirectional fibers extend in a longitudinal direction along each stiffening element.

4. An apparatus, comprising:
   a laminate skin, wherein the laminate skin is a cloth saturated with an epoxy resin matrix material cured using at least one of: (i) heat and (ii) a hardener mixed with the epoxy resin; and
   a plurality of composite laminate stiffening elements attached to the laminate skin and arranged in an isogrid pattern, wherein each stiffening element includes:
      a first foot portion parallel with and bonded to the laminate skin,
      a first side wall normal to the laminate skin and attached to the first foot portion,
      a top portion parallel with and away from the laminate skin, the top portion having a first side attached to the first side wall,
      a second side wall normal to the laminate skin and attached to a second side of the top portion opposite the first side,
      a second foot portion, attached to the second side wall, parallel with and bonded to the laminate skin,
      a layer of unidirectional fibers proximate to the top portion of the stiffening element, wherein the unidirectional fibers extend in a longitudinal direction along the stiffening element, and
   at least one drain hole to permit liquid to leave a hollow portion of the stiffening element.

* * * * *